United States Patent
Sommers et al.

(10) Patent No.: US 11,916,774 B2
(45) Date of Patent: Feb. 27, 2024

(54) METHODS, SYSTEMS, AND COMPUTER READABLE MEDIA FOR PROCESSING CONTROL PLANE MESSAGES FOR EMULATED DATA CENTER SWITCHING FABRIC

(71) Applicant: Keysight Technologies, Inc., Santa Rosa, CA (US)

(72) Inventors: Christian Paul Sommers, Bangor, CA (US); Razvan Ionut Stan, Agoura Hills, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 17/841,629

(22) Filed: Jun. 15, 2022

(65) Prior Publication Data
US 2023/0412485 A1    Dec. 21, 2023

(51) Int. Cl.
*H04L 43/50* (2022.01)
*H04L 43/0817* (2022.01)
(Continued)

(52) U.S. Cl.
CPC ........... *H04L 43/50* (2013.01); *H04L 43/065* (2013.01); *H04L 43/0817* (2013.01);
(Continued)

(58) Field of Classification Search
CPC ... H04L 43/50; H04L 43/065; H04L 43/0817; H04L 43/0888; H04L 49/25; H04L 45/38;
(Continued)

(56) References Cited

U.S. PATENT DOCUMENTS 7,826,381 B1 * 11/2010 Kastuar ............... H04L 12/4641
370/242
9,007,922 B1 * 4/2015 Mittal ................. H04L 43/0805
370/242
(Continued)

FOREIGN PATENT DOCUMENTS

CN     114430385 A  *  5/2022
EP       3332511 A1  *  6/2018  .......... H04L 43/0811

OTHER PUBLICATIONS

Ankit Rao, Department of Computer Engineering, Pune Institute of Computer Technology, "High Availability and Load Balancing in SDN Controllers" International Journal of Trend in Research and Development, vol. 3(2), ISSN: 2394-9333 www.ijtrd.com, pp. 310-314 (Year: 2016).*

(Continued)

*Primary Examiner* — Glenton B Burgess
*Assistant Examiner* — Rachel J Hackenberg

(57) ABSTRACT

Methods, systems, and computer readable media for testing a network system under test (SUT). An example system includes physical application-specific integrated circuit (ASIC) switching resources and a switching environment emulator configured for emulating, using the physical ASIC switching resources, data center switching fabric comprising a plurality of data center fabric switching elements. The system includes a first control plane daemon implemented on at least one processor; the first control plane daemon is configured for processing control plane messages for a first data center fabric switching element. The system includes a first port for communicating at least a first control plane message for processing by the first control plane daemon.

14 Claims, 12 Drawing Sheets

(51) Int. Cl.
*H04L 43/0888* (2022.01)
*H04L 43/065* (2022.01)
*H04L 45/42* (2022.01)
*H04L 45/00* (2022.01)
*H04L 67/1038* (2022.01)

(52) U.S. Cl.
CPC .......... *H04L 43/0888* (2013.01); *H04L 45/22* (2013.01); *H04L 45/42* (2013.01); *H04L 67/1038* (2013.01)

(58) Field of Classification Search
CPC ......... H04L 45/22; H04L 45/42; H04L 45/44; H04L 67/1038; H04L 67/63
See application file for complete search history.

(56) References Cited

U.S. PATENT DOCUMENTS

| | | | | |
|---|---|---|---|---|
| 10,511,546 | B2* | 12/2019 | Singarayan | H04L 45/66 |
| 11,323,354 | B1 | 5/2022 | Sommers | |
| 2009/0300419 | A1* | 12/2009 | Silverman | G06F 11/2294 |
| | | | | 714/E11.026 |
| 2013/0332399 | A1* | 12/2013 | Reddy | H04L 43/0852 |
| | | | | 706/12 |
| 2015/0363522 | A1* | 12/2015 | Maurya | G06F 30/20 |
| | | | | 703/13 |
| 2018/0351869 | A1* | 12/2018 | Avci | H04L 43/50 |

OTHER PUBLICATIONS

Slowr, Alpine Docker Image for ExaBGP Control Plane Monitor (2020) https://github.com/slowr/ExaBGP-Monitor.
Dyninc, An Open Source Implementation of the BFD Protocol, (2017), https://github.com/dyninc/OpenBFDD.
The BGP Swiss Army Knife of Networking, Exa-Networks, 2022 https://github.com/Exa-Networks/exabgp.
DASH High Availability and Scale (2022) https://github.com/Azure/DASH/blob/main/documentation/high-avail/design/high-availability-and-scale.md.
DASH Ha Design (2022) https://github.com/Azure/DASH/blob/f003713c86a176a5bc8c284e054849dc24f9241b/documentation/high-avail/design/ha-design.md.
HL Arch Rack Design HA (2022) https://github.com/Azure/DASH/blob/pda99e8ec6a46543e2b0a9d658d375e86d5f34f1/documentation/high-avail/design/ha-functional-diagram.md.
SONiC BFD Enhancement HLD (2022) https://github.com/Azure/SONiC/blob/master/doc/bfd/BFD_Enhancement_HLD.md.
Bernat "BGP LLGR: Robust and Reactive BGP Sessions," APNIC Blog (2018) retrieved from https://blog.apnic.het/2018/11/06/bgp-llgr-robust-and-reactive-bgp-sessions.
Scholl, BFD Article—NANOG (2020) https://archive.nanog.org/meetings/nanog45/presentations/Monday/Scholl_BFD_N45.pdf.
Rekhter, et al., "A Border Gateway Protocol 4 (BGP-4)", (2006) https://datatracker.ietf.org/doc/html/rfc4271.
Katz, et al., Bidirectional Fowarding Detection (BFD), RFC 5880 (2010) https://datatracker.ietf.org/doc/html/rfc5880.
Katz, et al., Bidirectional Forwarding Detection (BFD) for IPv4 and IPv6 (Single Hop), RFC 5881 (2010), https://datatracker.ietf.org/doc/html/rfc5881.
Katz, et al., Generic Application of Biderectional Forwarding Detection (BFD), RFC 5882 (2010) https://datatracker.ietf.org/doc/html/rfc5882.
Katz, et al., "Bidirectional Forwarding Detection (BFD) for Multihop Paths", RFC 5883 (2010) https://datatracker.ietf.org/doc/html/rfc5883-RFCs.
Downing, "Bidirectional Forwarding Detection (BFD)", RFC 5881 (2010) https://networktechstudy.com/home/learning-about-bidirectional-forwarding-detection-bfd.
Gautam "A Scalable Container-Based Virtualized Data Center Emulation Framework," 2022 14th International Conference on COMmunication Systems & NETworkS (COMNETS)—Demos and Exhibits.

* cited by examiner

METHODS, SYSTEMS, AND COMPUTER READABLE MEDIA FOR PROCESSING CONTROL PLANE MESSAGES FOR EMULATED DATA CENTER SWITCHING FABRIC

TECHNICAL FIELD

The subject matter described herein relates to network testing. More specifically, the subject matter relates to methods, systems, and computer readable media for processing control plane messages for emulated data center switching fabric.

BACKGROUND

Data center environments typically provide high reliability and security and typically include networked resources (e.g., virtual or physical servers connected via network switches) sharable by multiple clients of the data center operator. Large data centers are industrial scale operations using as much electricity as a small town. Various data centers may utilize virtualization.

When testing data center equipment, it is important to make sure that testing mimics real world scenarios and conditions. For example, when testing a data center server or related applications, it may be necessary to mimic or emulate resources in the data center. For example, when testing a data center server or related applications, it may be necessary to mimic or emulate a switching fabric or other resources in the data center and to emulate or approximate various equipment or system related states, e.g., by using various test system configurations or settings and/or effecting various impairments.

Accordingly, a need exists for methods, systems, and computer readable media for processing control plane messages for emulated data center switching fabric.

SUMMARY

Methods, systems, and computer readable media for testing a network system under test (SUT). An example system includes physical application-specific integrated circuit (ASIC) switching resources and a switching environment emulator configured for emulating, using the physical ASIC switching resources, data center switching fabric comprising a plurality of data center fabric switching elements. The system includes a first control plane daemon implemented on at least one processor; the first control plane daemon is configured for processing control plane messages for a first data center fabric switching element. The system includes a first port for communicating at least a first control plane message for processing by the first control plane daemon. The first port can be configured for communicating test traffic with the SUT. The first control plane message can be received from, and/or transmitted to, one of a test system component (e.g., an SDN controller or SDN controller emulation associated with the test system) or one or more DUT/SUT devices.

An example method includes emulating, using physical application-specific integrated circuit (ASIC) switching resources, data center switching fabric comprising a plurality of data center fabric switching elements. The method includes processing, by a first control plane daemon implemented on at least one processor, control plane messages for a first data center fabric switching element. The method includes communicating, by a first port, test traffic with the SUT, wherein the test traffic includes at least a first control plane message for processing by the first control plane daemon.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including one or more processors, network interfaces, and memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for testing a system under test (SUT). A test system (e.g., one or more computing platforms, devices, or nodes) may include physical application-specific integrated circuit (ASIC) switching resources and a switching environment emulator configured for emulating, using the physical ASIC switching resources, data center switching fabric. The data center switching fabric can include data center fabric switching elements, i.e., multiple emulated switches. The test system can include test traffic generation and integrated monitoring capability for executing test scripts and producing and outputting test reports.

To execute some kinds of tests, the test system may need to change routes dynamically, for instance, by participating in border gateway protocol (BGP) and bidirectional forwarding detection (BFD) control transactions that are originated by or involve the SUT during execution of a test. For example, testing a Disaggregated APIs for SONiC (DASH) high-availability configuration may require the test system to be able to send and receive BGP/BFD information from the SUT and process the information accordingly, e.g., by updating a route, withdrawing a route, or the like.

To accommodate these tests, the test system can be configured to emulate data center switching elements that are configured to behave as control plane endpoints (e.g., BGP/BFD endpoints) with respect to the SUT. The test system can be configured to host control plane daemons for processing control plane messages for data center fabric switching elements. The control plane daemons can be implemented, e.g., on a local processor of the test system or remotely by way of a control plane relay.

Figure 1:
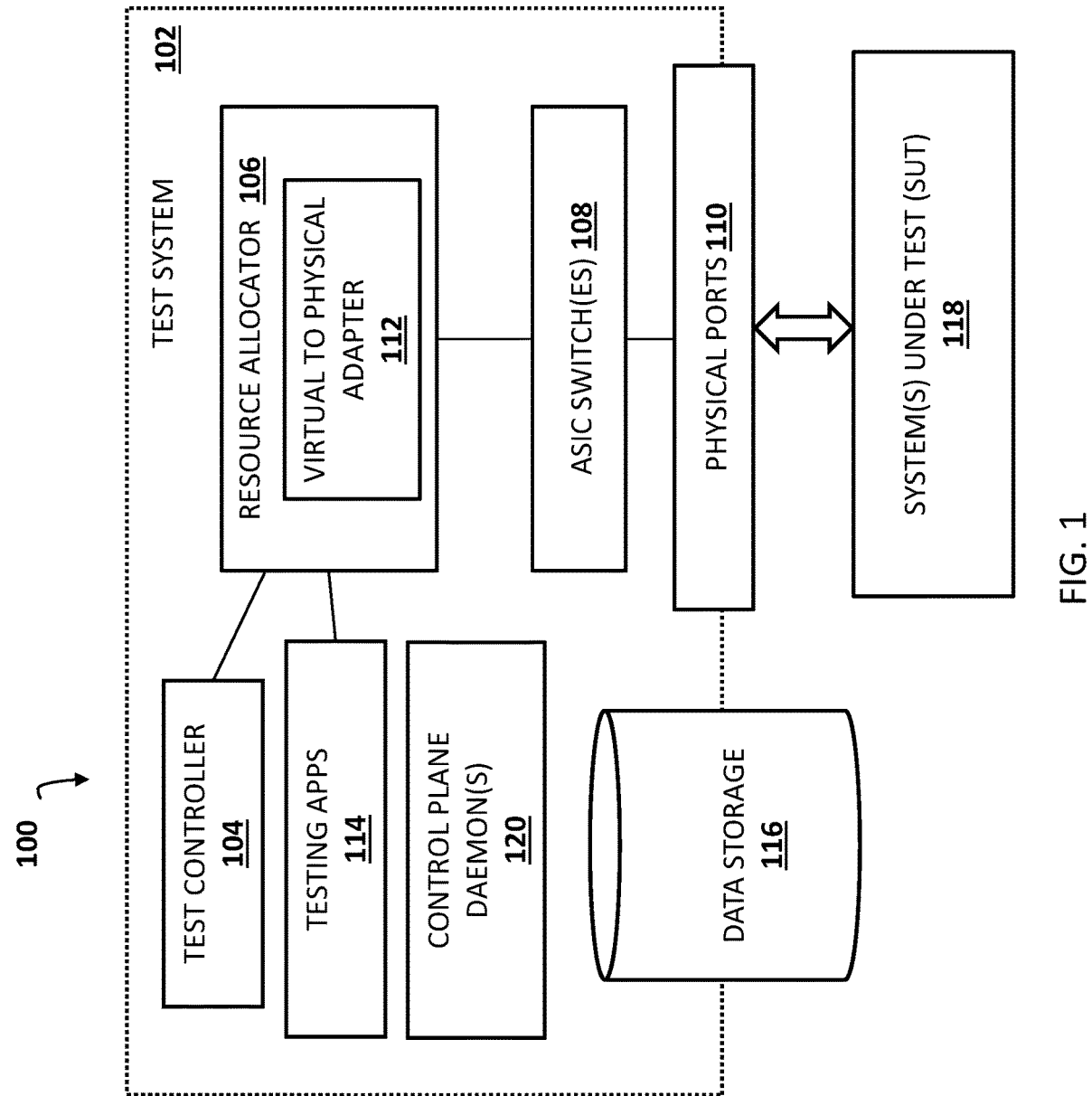
FIG. 1 is a diagram illustrating a computing environment for testing a network SUT.

FIG. 1 is a diagram illustrating a computing environment 100 for testing a network SUT 118. The computing environment 100 may include one or more networks and/or one or more computer platforms, nodes, or devices. The computing environment 100 includes a test system 102 and the SUT 118.

The test system 102 is a computer system (e.g., one or more computing platforms, nodes, or devices) associated with testing SUT 118 (e.g., one or more application servers, a network controller, or the like). For example, the test system 102 may generate and send traffic to the SUT 118 and/or receive traffic from the SUT 118 and may analyze one or more performance aspects associated with the SUT 118. The SUT 118 is typically a computer system (e.g., devices, systems, or platforms) for receiving, processing, forwarding, and/or sending one or more messages (e.g., packets).

The test system 102 can be implemented using a stand-alone tool, a testing device, a network equipment test device or platform, or software executing on one or more processor(s). The test system 102 may be a single device or node or may be distributed across multiple devices or nodes. In some embodiments, the test system 102 includes one or more modules for performing various test related functions. For example, the test system 102 may include a traffic (e.g., packet) generator for generating test traffic and/or testing related applications (e.g., a test analyzer or test configuration manager) for testing the SUT 118.

The test system 102 may include a test controller (TC) 104, resource allocator (RA) 106, physical ASIC switch(es) 108, ports 110, testing applications 114, and data storage 116. The TC 104 may be any suitable entity or entities (e.g., software executing on a processor, a field-programmable gateway array (FPGA), and/or an ASIC, or a combination of software, an FPGA, and/or an ASIC) for performing one or more aspects associated with testing SUT 118 and/or various aspects thereof. In some embodiments, the TC 104 may be implemented using one or more processors and/or memory. For example, the TC 104 may utilize one or more processors (e.g., executing software stored in memory) to generate traffic patterns or scenarios for various message streams (e.g., flows or sessions). In another example, the TC 104 may also utilize one or more processors to perform or initiate various tests and/or analyses involving test packets and/or related responses from the SUT 118. The TC 104 may send instructions to various modules or entities, e.g., the testing applications 114, in test system 102 for controlling (e.g., to pause, (re)start, or stop) a test session.

In some embodiments, the TC 104 may interact with one or more testing applications 114. The testing applications 114 can be, e.g., software for configuring the test system 102 or portions thereof. In some embodiments, the testing applications 114 can include, but are not limited to, visibility applications, SDN controller applications, GUI and CLI applications, and test traffic generation applications for communicating with the SUT 118 and/or an emulated switching fabric environment implemented using ASIC switch(es) 108.

In some embodiments, the test system 102 or aspects thereof may be controlled or defined using one or more user-definable data models. For example, the test system 102 may provide a GUI to allow a user to configure or modify a switch ASIC resource allocator model, a switching model, a data center emulation or switching topology model, a traffic generator model, a network visibility model, etc. In this example, high-level or user-definable data models may be converted into lower-level data models or into computer readable instructions for implementing the user-definable data models, e.g., implementing a data center emulation model on the ASIC switch(es) 108.

In some embodiments, the testing applications 114 may include or utilize one or more user interfaces for receiving settings and/or configuration information for setting up a testing scenario or a related test session. For example, a user interface may include any interface usable by one or more types of user (e.g., a human or another entity like an application, a machine, or a device) to interact with the test system 102 or related entities. In some embodiments, one or more user interfaces may support automation e.g., via one or more programming languages (e.g., python), a representation state transfer (REST) API, a remote procedure call API (e.g., gRPC API), a command line interface (CLI), a machine-to-machine (M2M) automation interface, and/or a web based GUI. For example, a test operator may use a web browser to interact with a web based GUI associated with the TC 104 and/or the testing applications 114 for programming or configuring one or more aspects for testing the SUT 118. In another example, a network controller may utilize a M2M automation interface for programming or configuring one or more aspects for testing the SUT 118.

In some embodiments, the testing applications 114 may include or utilize a GUI or other user interface for selecting and/or configuring emulated switching fabric environments and/or other related settings (e.g., test reporting and/or network visibility settings). For example, the testing applications 114 may include a web based GUI for obtaining a test operator or another entity's intent for setting up or configuring testing scenarios and/or related emulated switching fabric environments. In this example, the GUI can be used to visually describe a topology comprising one or more emulated switches and/or to indicate particular physical resources to allocate to each emulated switch. In another example, the GUI can be used to gather test session settings and/or other information.

In some embodiments, from an end user perspective, a test system related user interface may provide and/or receive configuration settings for emulated switches associated with an emulated data center environment. In such embodiments, a user can use the user interface to configure a specific data center environment in which the SUT 118 will operate or interact with and can monitor performance of both the SUT 118 and the performance of the emulated switches that comprise the emulated data center environment.

In some embodiments, the testing applications 114 may include or utilize a traffic generator. For example, a traffic generator may be any suitable entity or entities (e.g., software executing on a processor, an ASIC, an FPGA, or a combination of software, an ASIC, or an FPGA) for performing one or more aspects associated with generating or synthesizing test sessions, test cases, or related test packets. In this example, the traffic generator may be configured to utilize user input and predefined test case templates or related data to generate one or more test cases and/or test sessions.

In some embodiments, the testing applications 114 may include or utilize a reporting module and may be configurable by the TC 104. For example, a reporting module may be any suitable entity or entities (e.g., software executing on a processor, an ASIC, an FPGA, or a combination of software, an ASIC, or an FPGA) for reporting various information about testing using network visibility functions and/or components (e.g., using virtual or physical probes or network taps). In this example, virtual taps or software may be configured to generate and/or provide switch metrics or other information (e.g., network telemetry, switch and/or link status information, etc.) associated with one or more virtualized switching fabric elements (e.g., emulated switches) of an emulated switching fabric environment. Continuing with this example, the reporting module may generate performance reports or test analysis reports associated with the SUT 118, e.g., by utilizing the switch metrics or other information associated with packets that pass through or are generated by SUT 118.

The ASIC switch(es) 108 include one or more ASICs (and hardware, firmware, and/or software) for performing one or more functions associated with network switching. For example, the ASIC switch(es) 108 may utilize an ASIC pipeline for performing frame or packet forwarding, e.g., sending a packet received from one port out another port of the switch. In some embodiments, various resources (e.g., lookup tables or match-action tables used for forwarding decisions, traffic manager buffer memory, traffic manager logical queues, etc.) of the ASIC switch(es) 108 may managed and/or allocated to provide virtualized or emulated switches by the RA 106.

The ports 110 may include or utilize any suitable components (e.g., one or more network interface cards (NICs), pluggable jacks, physical processors, transceiver modules, direct-attach cables (DACs) and/or other hardware) for sending or receiving communications. For example, the test system 102 may use one or more multiple ports 110 (e.g., physical connection ports) for receiving and sending various types of test packets or related data units; such as IP messages, Ethernet frames, Ethernet messages, packet data units (PDUs), datagrams, user datagram protocol (UDP) messages, TCP messages, IP version 4 (v4) messages, IP version 6 (v6) messages, stream control transmission protocol (SCTP) messages, real-time transport protocol (RTP) messages, or reliable data protocol (RDP) messages, messages using a tunneling protocol, control plane packets with, e.g., BGP messages, and/or other data units.

In some embodiments, the ports 110 may include user traffic ports and management ports. For example, user traffic ports may be associated with processing, sending, and/or receiving test traffic, non-test traffic, and/or in-band management related communications and management ports may be associated with processing, sending, and/or receiving out-of-band management related communications.

In some embodiments, the ports 110 may include multiple port modules or groups of ports for interacting with the SUT 118. For example, depending on a test operator's configuration settings or a particular test session setup, the RA 106 may allocate a portion of physical resources to each switch that is emulated, where the emulated switches are collectively used to mimic a data center switching fabric. In some embodiments, each emulated switch may be allocated or associated with one or more of the ports 110 and the port association may be static or semi-static (e.g., particular ports may be assigned to an emulated switch for a given test session).

The RA 106 may be any suitable component (e.g., software executing on a processor, an FPGA, an ASIC, or a combination of software, an FPGA, and/or an ASIC) for performing one or more aspects associated with allocating and managing emulated switches. In some embodiments, the RA 106 may allocate and manage resources of the ASIC switch(es) 108 for providing emulated switches without requiring a custom ASIC pipeline. In some embodiments, the RA 106 can be external or internal to the ASIC switch(es) 108.

In some embodiments, the RA 106 may include a virtual to physical adapter 112. The virtual to physical adapter 112 may be any suitable component (e.g., software executing on a processor, an FPGA, an ASIC, or a combination of software, an FPGA, and/or an ASIC) for converting and/or translating communications to refer to virtual or physical resources depending on the destination. For example, when requesting information about available switching resources via the RA 106, the testing applications 114 and/or the SUT 118 may "see" a set of emulated switches each with a subset of resources instead of the ASIC switch(es) 108. In this example, the virtual to physical adapter 112 may translate information about virtual resources into information physical resources of a single ASIC switch (e.g., Tomahawk 3) and vice versa so that interacting nodes may remain unaware of the underlying ASIC switch(es) 108 or related switch resources.

In some embodiments, the RA 106 and/or the virtual to physical adapter 112 may reside between a native device interface and interacting entities (e.g., the SUT 118, the testing applications 114, or external devices) and may act as a communications proxy or agent using a virtual interface. For example, the SUT 118 may include a network switch controller that configures switching resources by sending, via a virtual interface associated with the RA 106, configuration requests for requesting and/or configuring one or more switches. In this example, the RA 106 and/or the virtual to physical adapter 112 may translate the configuration requests received via the virtual interface into one or more corresponding requests for transmission via a native switch interface, where the corresponding requests include commands for configuring appropriate physical resources of the underlying ASIC switch(es) 108. Further, the RA 106 and/or the virtual to physical adapter 112 may translate switch performance results coming from a native switch interface into virtualized results (e.g., link status or counter values for a physical port '60' may be changed to values for a virtual port 'v1' on an emulated switch TORSW1) before sending the virtualized results to the network switch controller via the virtual interface.

In some embodiments, the RA 106 and/or the virtual to physical adapter 112 may create, store, and/or use switching fabric emulation data (e.g., physical to virtual port mapping, physical buffers to virtual buffers mapping and resource allocation, etc.) and related policies (e.g., virtual and real port speed, virtual and real throughput, topologies, forwarding rules, classes of service, etc.) for sharing physical switch resources amongst the emulated switches. For example, by using port mapping data and policies stored in the data storage 116, virtual ports 'v1', 'v2', 'v3' on an emulated switch TORSW1 may be translated into physical ports '60', '61', '62', respectively. In this example, configuration commands for setting speed of port 'v1' can be translated so that the speed of corresponding physical port '60' is set. Continuing with this example, to query the statistical counters for virtual port 'v1', the statistical counters for physical port '60' may be queried.

In some embodiments, the RA 106 and/or the virtual to physical adapter 112 may utilize a modified proprietary (e.g., vendor) API (e.g., a vendor's software development kit (SDK) or by utilizing a wrapper API that interacts with a vendor API. For example, by using a wrapper API, the RA 106 can manage a virtualized or emulated fleet of switches using off-the-shelf or commodity ASICs with NOSes that utilize a proprietary or vendor API.

In some embodiments, the RA 106 and/or the virtual to physical adapter 112 may utilize a custom adaptor that handles certain applications or functions which may involve a subset of resource management and mapping requirements than a standard switching API. For example, by using a custom adaptor, the RA 106 can manage a virtualized or emulated fleet of switches for certain use cases using off-the-shelf or commodity ASICs.

In some embodiments, the test system 102 or components thereof (e.g., TC 104, testing applications 114, and/or RA 106) may include functionality for accessing data storage 116. The data storage 116 may be any suitable component (e.g., a storage device, a non-transitory computer readable medium, or a storage system) for maintaining or storing information related to switching fabric emulation, network testing, or related test analysis. For example, the data storage 116 may include switching fabric emulation data (e.g., physical to virtual port mapping, physical buffers to virtual buffers mapping, etc.) and related policies (e.g., virtual and real port speed, virtual and real throughput, topologies, forwarding rules, classes of service, etc.) for sharing physical switch resources amongst the emulated switches. The data storage 116 may also include test traffic models, test cases, test session data, topology information for emulated switching fabric environments and/or for the SUT 118, and/or other information usable for generating performance metrics (e.g., statistics) associated with one or more aspects of the SUT 118. In some embodiments, the data storage 116 may be located at the test system 102, another node, or distributed across multiple platforms or devices.

The test system 102 includes one or more control plane daemons 120 configured for processing control plane messages for data center fabric switching elements. The control plane daemons 120 are implemented on at least one processor, e.g., a local processor or a processor on a remote system such as a cloud computing system.

Figure 2:
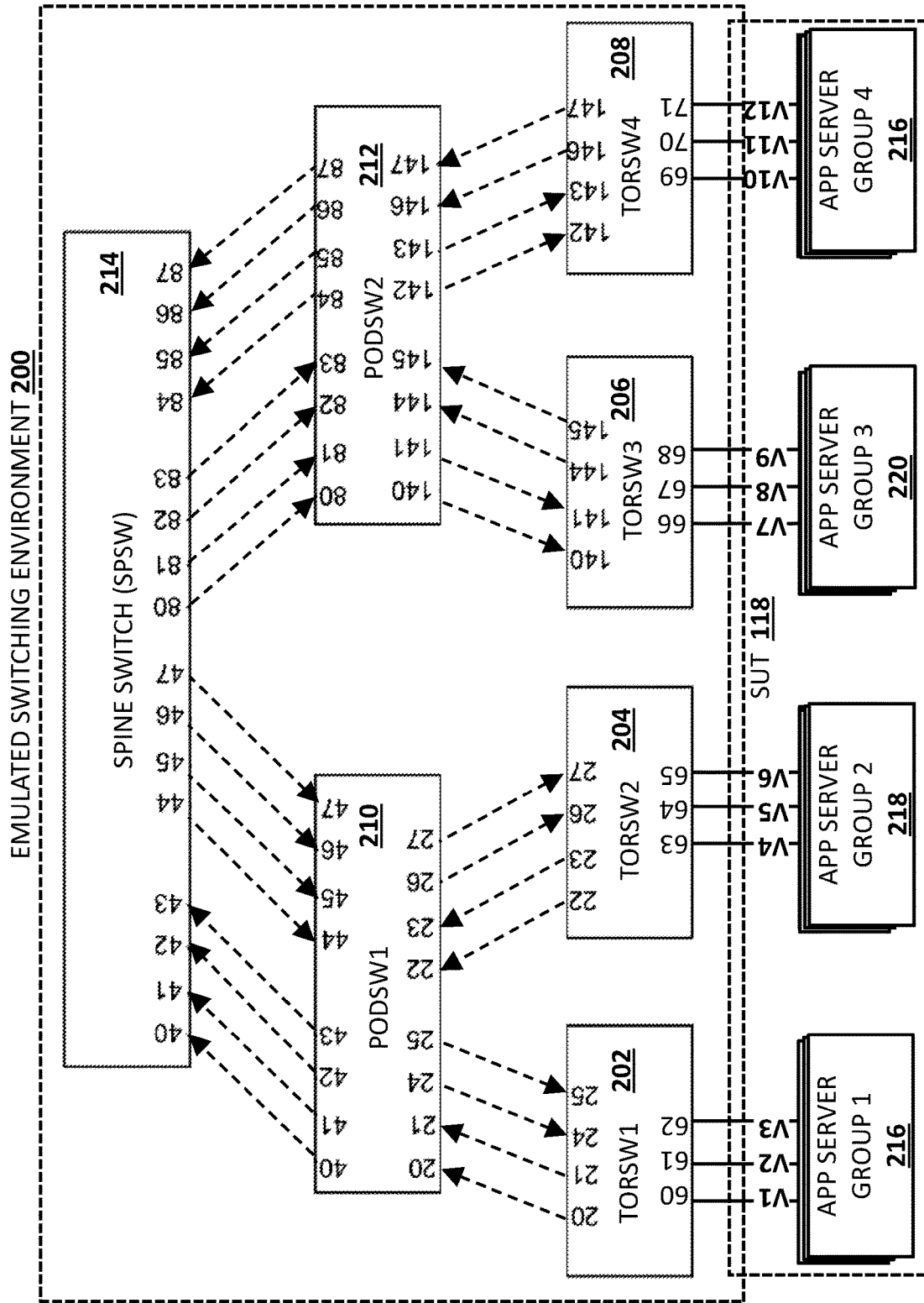
FIG. 2 is a diagram illustrating an example emulated switching fabric environment usable for network testing.

FIG. 2 is a diagram illustrating an example emulated switching fabric environment 200 usable for network testing. The emulated switching fabric environment 200 may represent an emulated data center environment comprising virtualized switching fabric elements (e.g., emulated switches) for forwarding packets from or to the SUT 118 or other entities. For example, the emulated switching fabric environment 200 may be based on user input and/or predetermined environment templates or data models, e.g., stored in data storage 116.

The emulated switching fabric environment 200 may represent a 3-stage Clos switching network comprising different stages of emulated switches, e.g., stage one may include top of rack (TOR) switches (TORSWs) 202-208, stage two may include cluster or pod switches (PODSWs) 210-212, and stage three may include a spine switch (SPSW) 214 and may be implemented using the RA 106 and physical resources of one or more ASIC switch(es) 108. For example, TORSWs 202-208 may represent or emulate switches that are connected to multiple servers (e.g., located within a rack or nearby rack), PODSWs 210-212 may represent or emulate aggregation switches that are connected to multiple TORSWs, and SPSW 214 may represent or emulate a higher-level aggregation switch that is connected to multiple PODSWs.

In some embodiments, some physical ports of ASIC switch(es) 108 may be associated with different emulated switches and may utilize loopback interfaces or internal interfaces for emulating communications between some emulated switches, while other emulated switches (e.g., TORSWs 202-208) may utilize physical interfaces and/or physical cabling to communicate with the SUT 118 or portions thereof.

In some embodiments, the SUT 118 may include a set of application server groups 216-222, each including one or more servers and/or applications. For example, application server group 1 216 may include multiple servers (e.g., 16 or more servers in a single rack), each having one or more connections to a TOR switch. In some examples, a server of application server groups 216-222 may include multiple applications or perform different services (e.g., machine learning (M/L), storage offload, search engines, webpages, video streaming, email, etc.) for users or may perform similar services for different sets of users. In some examples, a server of application server groups 216-222 may act as a client to another server.

In some embodiments, each of application server groups 216-222 may be connected (e.g., physically cabled) to a different set of physical ports 110 of test system 102, where each set of physical ports 110 is assigned or allocated to a particular emulated switch. For example, the RA 106 may assign physical ports '60', '61', and 62' to an emulated switch TORSW1 and may virtualize those physical ports as 'v1', 'v2', and 'v3', respectively. In this example, applications and/or servers in application server group 1 216 may be communicatively coupled to one or more of the virtual ports of the emulated switch TORSW1'.

Figure 3:
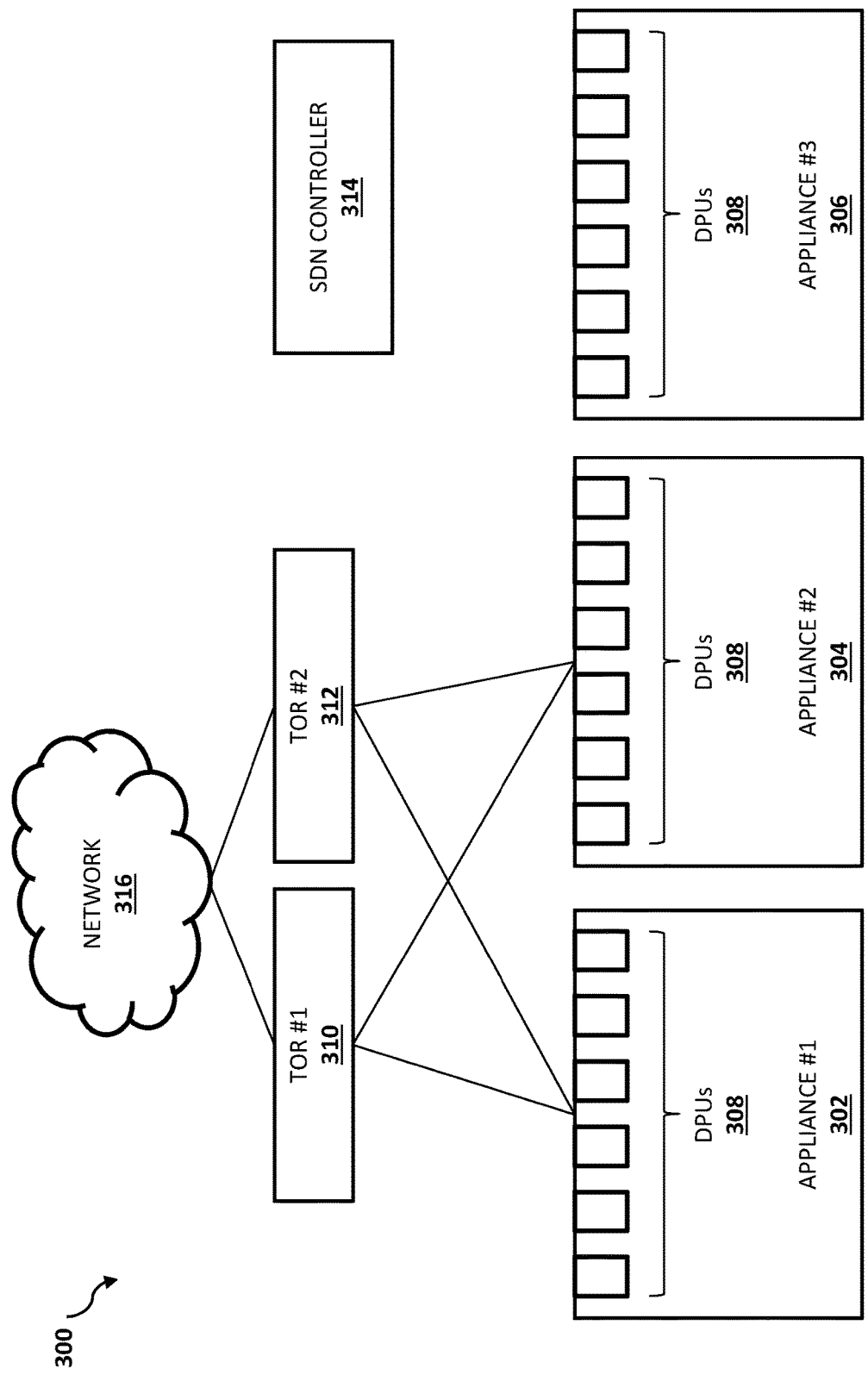
FIG. 3 is a block diagram illustrating an example DASH high-availability system.

FIG. 3 is a block diagram illustrating an example DASH high-availability system 300. The system 300 is one possible instantiation of a high-availability architecture including a primary computing appliance 302, a backup computing appliance 304, and one additional computing appliance 306.

Each of the computing appliances 302, 304, and 306 can be housed in a chassis or other appropriate structure and includes computer processing resources, e.g., a number of data processing units (DPUs). As shown in this example, each of the computing appliances 302, 304, and 306 includes six DPUs 308.

The system 300 includes two Top of Rack (ToR) switches 310 and 312. The ToR switches 310 and 312 are each connected to each of the DPUs 308 in the computing appliances 302 and 304. Each DPU has a high-availability peering partner in the other computing appliance. The system 300 includes a software defined networking (SDN)

controller 314 that is configured to set up routes in all of the depicted devices. The ToR switches 310 and 312 can be connected to a network 316, e.g., by a number of different shared communications lines. The system 300 is configured to handle failures of single DPU cards, DPU-ToR links, an entire chassis full of DPUs, or of one ToR switch.

BGP is used to convey route information between the DPUs 308 located in the computing applications 302 and 304 and the ToR switches 310 and 312. An active DPU advertises a route to serve its connection, and a standby DPU does the same but with a typically longer, unpreffered path length, although the path could have an equal cost. The ToR switches 310 and 312 determine to route traffic to the preferred (active) DPU.

BFD is a protocol defined by the BFD working group at the Internet Engineering Task Force (IETF). BFD defines a method of rapid detection of the failure of a forwarding path by checking that the next hop router is alive. The protocol will be able to detect the forwarding path failure in, e.g., a few milliseconds, depending on the actual configuration. In some conventional configurations, a routing protocol can take a few seconds (from three seconds to 180 seconds or even more) to detect that a neighboring router, the next hop router, is not operational, which can cause packet loss due to incorrect routing information. BFD can provide a rapid forwarding path failure detection service to a routing protocol in a few milliseconds.

In a SONiC system, BFD is part of the FRRouting BGP container. FRR is software that implements and manages various IPv4 and IPv6 routing protocols. It runs on nearly all distributions of Linux and BSD as well as Solaris and supports all modern CPU architectures. A BFD daemon communicates with a Linux kernel using a user datagram protocol (UDP) socket to send and receive BFD packets. BFD relies on the Linux kernel for routing of BFD packets to destinations.

BFD communicates to applications like BGP though GNU Zebra. Zebra is a routing software package that provides TCP/IP based routing services. Zebra supports traditional IPv4 routing protocols and IPv6 routing protocols. Zebra provides routing protocol management information bases. BGP can send BFD session create/delete events through Zebra and, in case of session timeout, BFD can inform BGP through Zebra.

In the system 300 of FIG. 3, each DPU establishes both BGP and BFD peering relationships with the ToR switches 310 and 312 over respective links between the DPUs 308 and the ToR switches 310 and 312. BFD can detect link failures more quickly than BGP alone, and BFD is used as a fast failure mechanism to alert BGP that a route has failed. When a failure occurs in a DPU, computing appliance, or ToR-DPU link, it is detected in the ToR switch, and the associated BGP session to that DPU will withdraw the active route and reroute traffic to the standby route.

To use the test system 100 of Figure to emulate the system 300 of FIG. 3, including the ToR switches 310 and 312, the test system 100 can be configured to emulate the ToR switches 310 and 312 and to implement BGP and BFD daemons that peer with the DPUs 308. This will allow the emulated ToRs to 1) detect a failed route, signifying the need for a route withdrawal, and 2) signal to the internal dataplane to withdraw the route.

Figure 4:
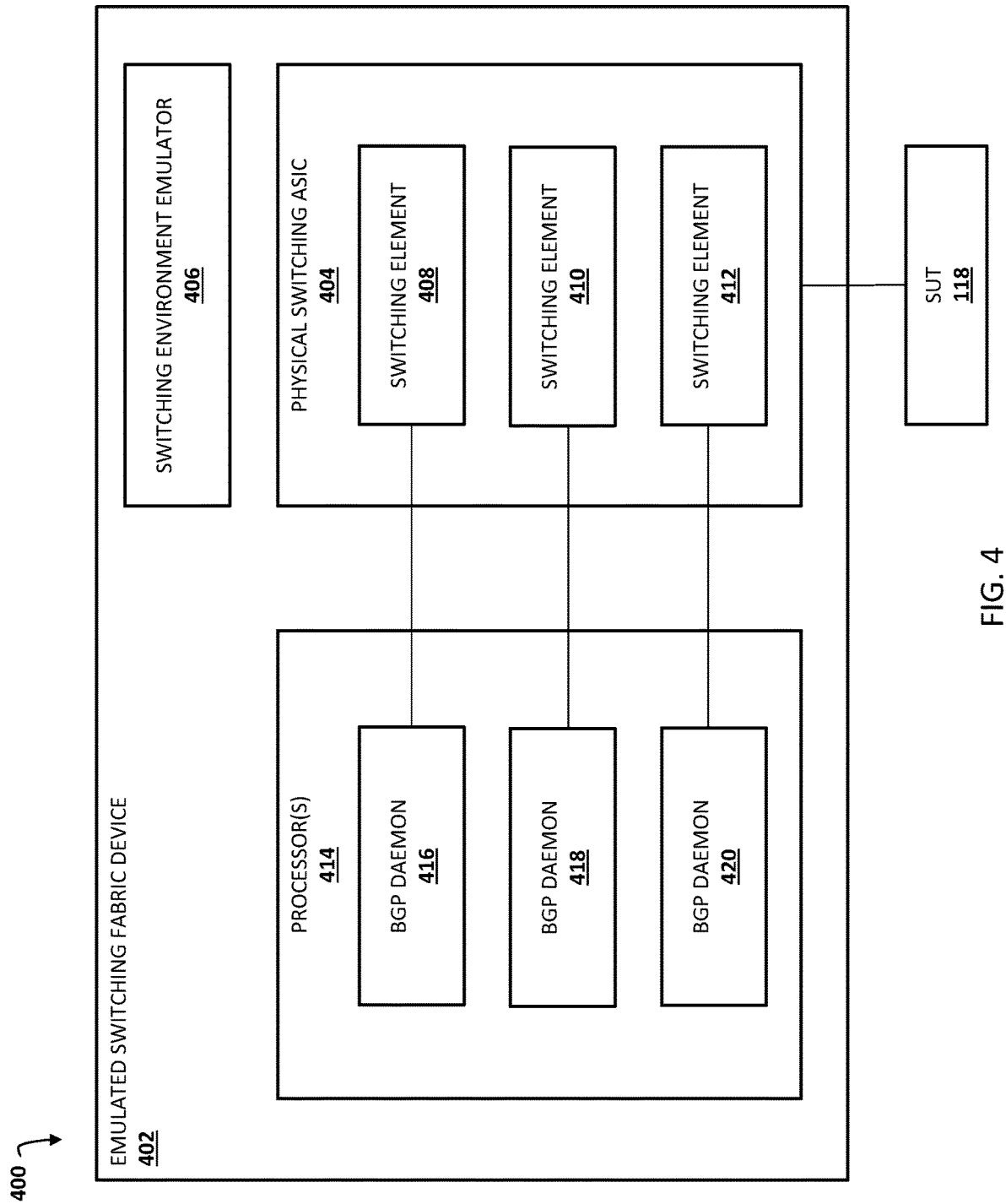
FIG. 4 illustrates an example test system for testing the SUT using an emulated switching fabric device.

FIG. 4 illustrates an example test system 400 for testing the SUT 118 using an emulated switching fabric device 402. The emulated switching fabric device 402 includes physical ASIC switching resources 404 and a switching environment emulator configured for emulating, using the physical ASIC switching resources, data center switching fabric comprising data center fabric switching elements 408, 410, and 412. The emulated switching fabric device 402 includes one or more processors 414 implementing control plane daemons 416, 418, and 420. Each of the control plane daemons 416, 418, and 420 is configured for processing control plane messages for one of the corresponding data center switching elements 408, 410, and 412.

In some examples, the control plane daemons 416, 418, and 420 are BGP and BFP daemons and they are run in a Docker container (or other appropriate container) that is serviced by the processors 414. BGP/BFP commands or events directed to/related to one of the fabric switching elements 408, 410, and 412 may be translated by an internal SDN controller or other interworking function, so as to effectively convert the control plane command into a native command (or sequence of commands or events) that can be interpreted/performed by the fabric switch emulation subsystem. For instance, a BGP update command can be translated into native emulation engine instructions that result in a route change in the associate emulated switch.

Figure 5:
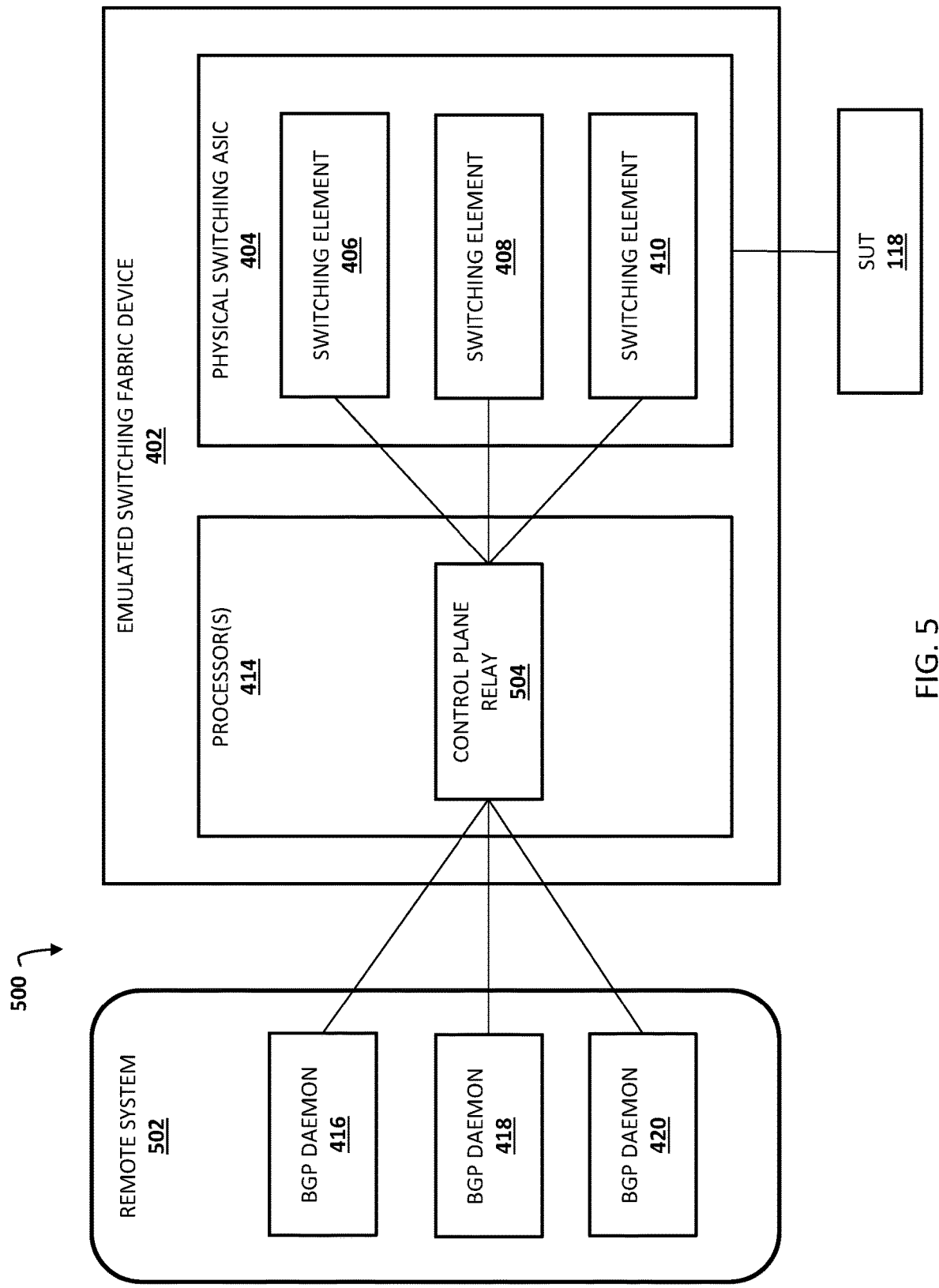
FIG. 5 is a block diagram of test system for testing the SUT using a remote system for hosting control plane daemons.

FIG. 5 is a block diagram of test system 500 for testing the SUT 118 using a remote system 502 for hosting control plane daemons 416, 418, and 420. In the system 500 of FIG. 5, the one or more processors 414 of the emulated switching fabric device 402 execute a control plane relay 504 configured to route control plane messages between switching elements 406, 408, and 410 and the control plane daemons 416, 418, and 420. The remote system 502 can be, e.g., an external processor on a computing device physically remote from a physical housing of the emulated switching fabric device 402. In some examples, the remote system 502 is a cloud computing system configured to execute the control plane daemons 416, 418, and 420, and the control plane relay 504 is configured to route messages to the remote system 502 by way of a network.

In some examples, the control plane daemons 416, 418, and 420 are BGP and BFP daemons and they are run in a Docker container (or other appropriate container) that is serviced by processors of the remote system 502. BGP/BFP commands or events directed to/related to one of the fabric switching elements 408, 410, and 412 may be translated by an internal SDN controller or other interworking function, so as to effectively convert the control plane command into a native command (or sequence of commands or events) that can be interpreted/performed by the fabric switch emulation sub-system. For instance, a BGP update command can be translated into native emulation engine instructions that result in a route change in the associate emulated switch.

Figure 6:
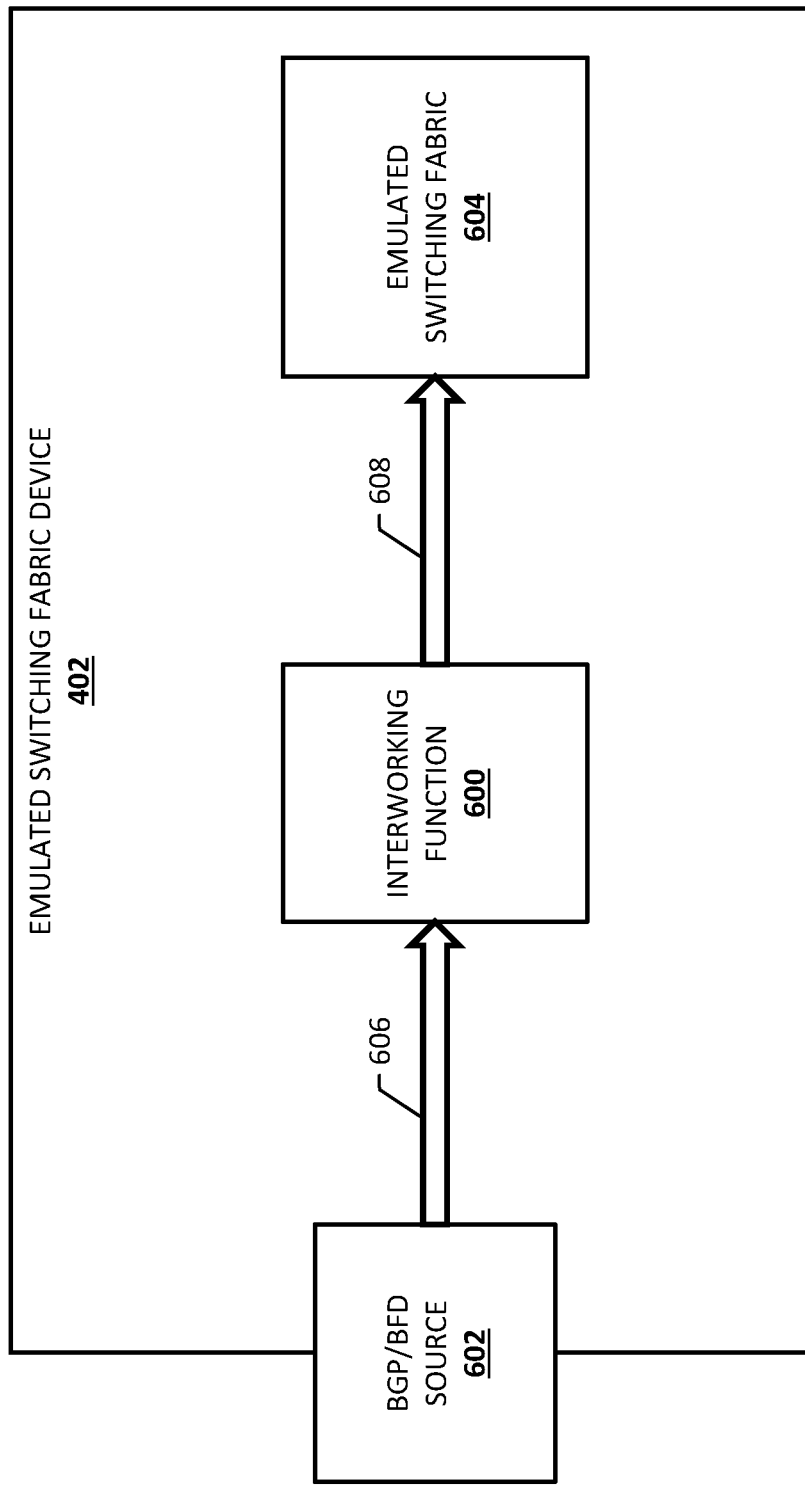
FIG. 6 is a block diagram illustrating an example bidirectional interworking function.

FIG. 6 is a block diagram illustrating an example bidirectional interworking function 600. The interworking function may be associated with or implemented by, e.g., a control plane relay module or an internal SDN controller.

The interworking function 600 is configured for receiving a control plane command 606 from a control plane source 602, e.g., a BGP/BFD daemon. The interworking function 600 is configured for converting the control plane command 606 into a native command 608 (or sequence of commands or events) that can be interpreted/performed by the fabric switch emulation sub-system 604. For instance, a BGP Update command can be translated into native engine instructions that result in a route change in the associated emulated switch. The interworking function 600 can also receive native commands and convert the native commands into control plane commands.

Figure 7:
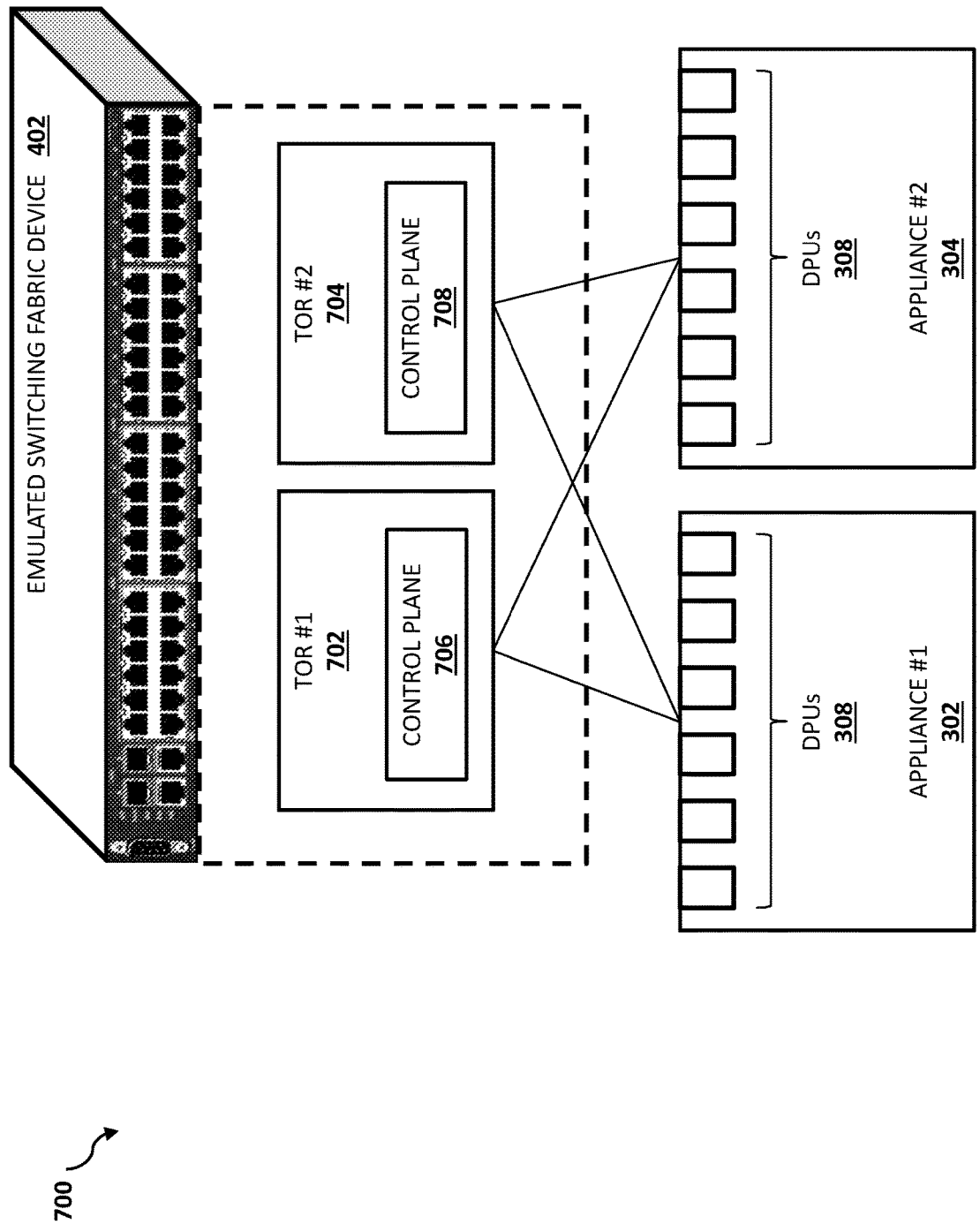
FIG. 7 is a block diagram of an example system for testing computing appliances and in a DASH high-availability configuration.

FIG. 7 is a block diagram of an example system 700 for testing computing appliances 302 and 304 in a DASH high-availability configuration by emulating two ToR switches 702 and 704 in an emulated switching fabric device 402. Each of the emulated switches 702 and 704 has an associated control plane daemon 706 and 708. Each of the emulated switches 702 and 704 can respond to DPU, link, or computing appliance failure as indicated by BGP or BFD failure detection mechanisms. When a failure occurs, the router in the emulated switch will select the next best route, which in the case of DASH, will be the route to the standby DPU.

An internal SDN controller can talk to the control plane daemons 706 and 708 to establish sessions, set up routes, and so on. The internal SDN controller can also set up the emulated network devices in the emulated switching fabric device 402 kernel so that the kernel can properly interact with the computing appliances 302 and 304.

Each emulated ToR switch 702 and 704 can thus establish control plane peering with DPUs 308 or other ToR switches as well as an external SDN controller, in some cases. Each emulated ToR switch can have its own IP address:port endpoints.

Figure 8:
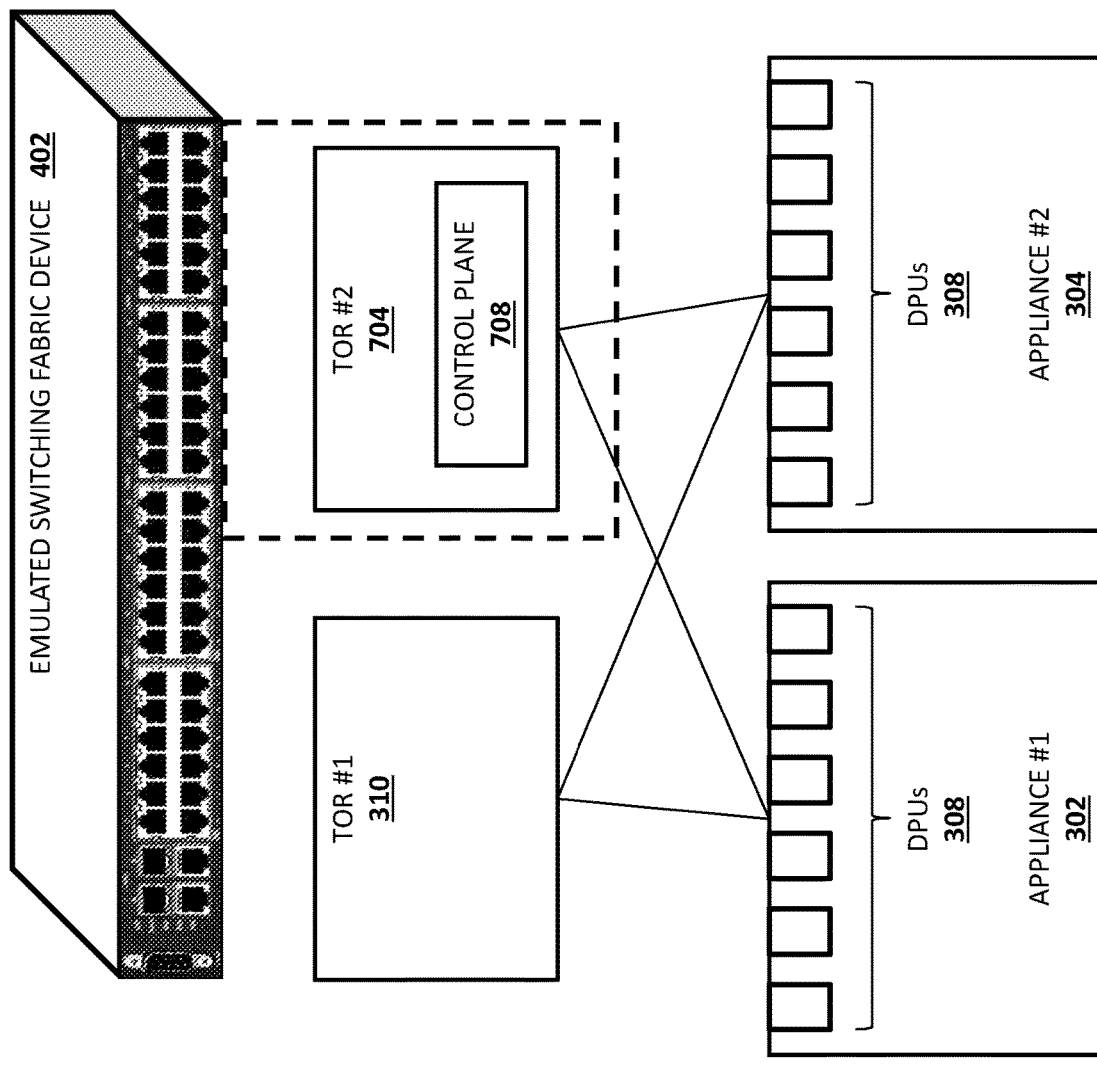
FIG. 8 is a block diagram of an alternative system for testing the computing appliances.

FIG. 8 is a block diagram of an alternative system 800 for testing the computing appliances 302 and 304 in a DASH configuration. In the system 800 of FIG. 8, the emulated switching fabric device 402 emulates one ToR switch 704, and the system includes a production ToR switch 310, e.g., a physical device with switching circuits. Use cases for this system 800 include:

- Comparative measurement and analysis of different control-plane implementations, where one ToR switch (production or emulated) implements a baseline control plane and other implements a proposed or alternate control plane
- Comparing the behavior of a ToR switch plus one of the computing appliances with an integrated replacement thereof, so that the rest of the system 800 is emulated and serves as a control or reference.

Figure 9:
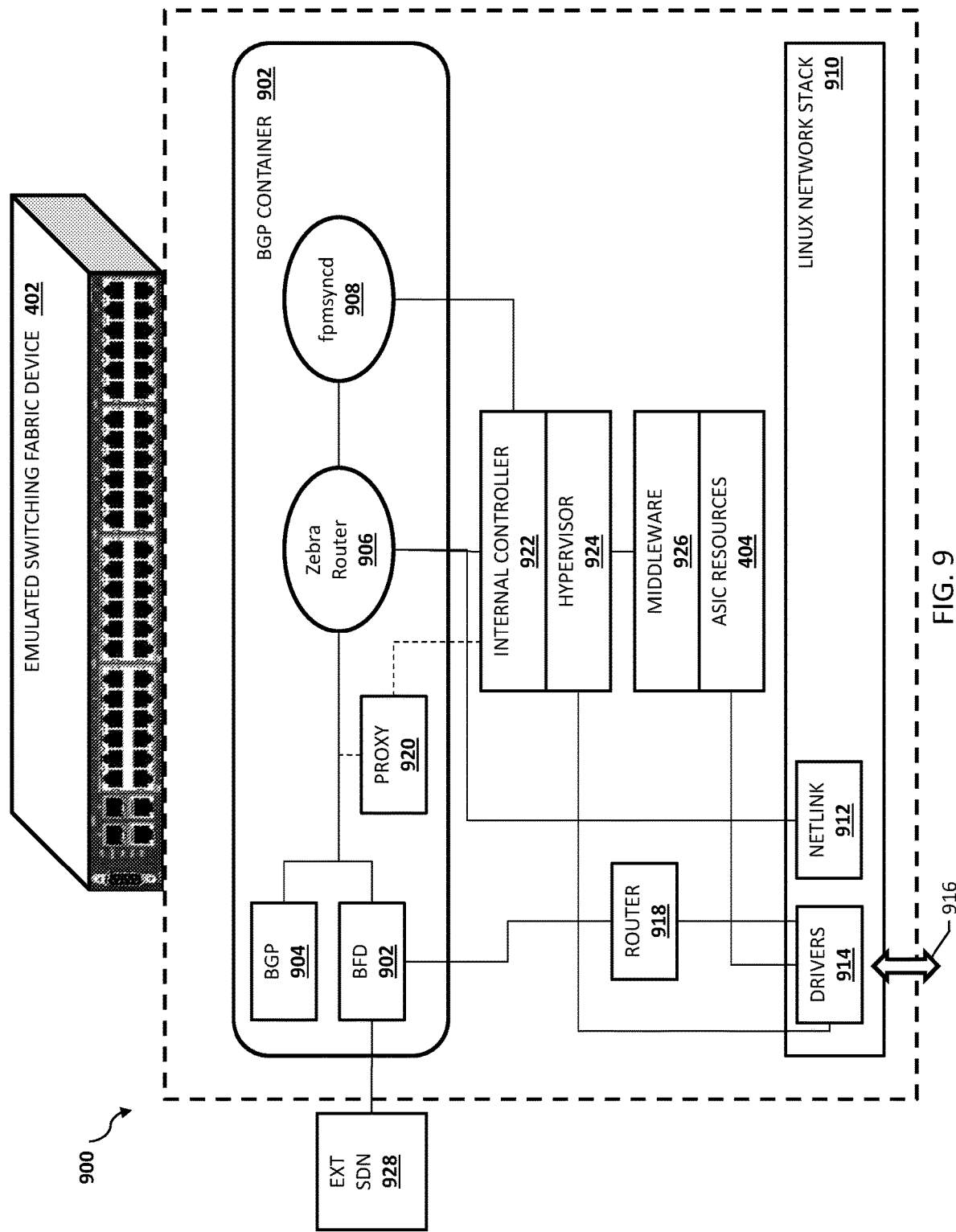
FIG. 9 is a block diagram of an example system for implementing the emulated switching fabric device.

FIG. 9 is a block diagram of an example system 900 for implementing the emulated switching fabric device 402. The system 900 includes a BGP container 902 as used in SONiC, one per each emulated switch having control plane functions (e.g., in some scenarios, such as DASH high availability testing, only ToR switches). The BGP container 902 comprises:

- A router daemon, for example, a free-range router (FRR) daemon collection, including, in this example, the following open-source daemons: BFD 902, BGP 904, and Zebra router 906.
- A custom forwarding plane manager daemon (FPMD) 908 that is configured to receive standard messages from the router and update the routing/forwarding tables of the emulated switching fabric device 402.

FIG. 9 shows connections between various components and the Linux kernel 910. In general, the system 900 can include any appropriate connections to synchronize the BGP container daemons with the emulated datacenter routes. As shown in FIG. 9, the Linux kernel 910 maintains routes for all emulated switches, which then is normally synchronized with the Zebra router 906 via Linux netlink 912 messages.

Likewise, the BFD 902 and BGP 904 daemons "see" Linux network devices (netdevs) representing the front-panel traffic ports 916 of the emulated switches. This linkage is conventionally provided by a "knet" or "kernel network" driver 914. Network namespacing (e.g., as used in Docker) can isolate the networks of each emulated switch's control plane. To implement this on the emulated switching fabric device 402, the internal controller 922 can be configured to communicate its static routes to the Linux kernel 910, e.g., via netlink 912. The routes can then be conveyed to the Zebra router 906 through normal netlink subscriptions. Zebra would then have a "view" of routes in the associated emulated switch.

In some examples, instead of using knet drivers and Linux routing 918 to forward control plane traffic to a switch, the system 900 can route traffic from the ASICs CPU port to the corresponding emulated switch's link using the routing inside the ASIC itself. For example, traffic from the CPU with the DPU's destination IP address can be forwarded to that DPU over the already-established routes that were defined in the emulated topology. This could potentially eliminate the need for some of the Linux operating system involvement in the solution (e.g., remove netlink, knet drivers, and the like and just use existing ASIC routing mechanisms).

Other configurations are possible including, e.g., bespoke designs which connect BFD/BPG damons (any appropriate implementation, for example, openbfd and exabgp, respectively) directly to a simpler router proxy which handles route add and withdrawal by performing immediate changes to the emulated switch's routes via the internal SDN controller and hypervisor.

The control plane packets can be transmitted from the ports 916 toward the SUT and back to the emulated fabric, and the system 900 is configured to forward back the messages to the appropriate router container.

FIG. 9 also shows an optional external SDN controller 928 configured to establish sessions and routes and an optional router proxy 920 in the BGP container 902. The system 900 can include a hypervisor 924 associated with the internal controller 922 and a ASIC SDK+middleware server 926 associated with the ASIC resources 404 for backend ASIC service abstraction. The hypervisor 924 can translate emulated routers and ports into physical ASIC configurations.

Figure 10:
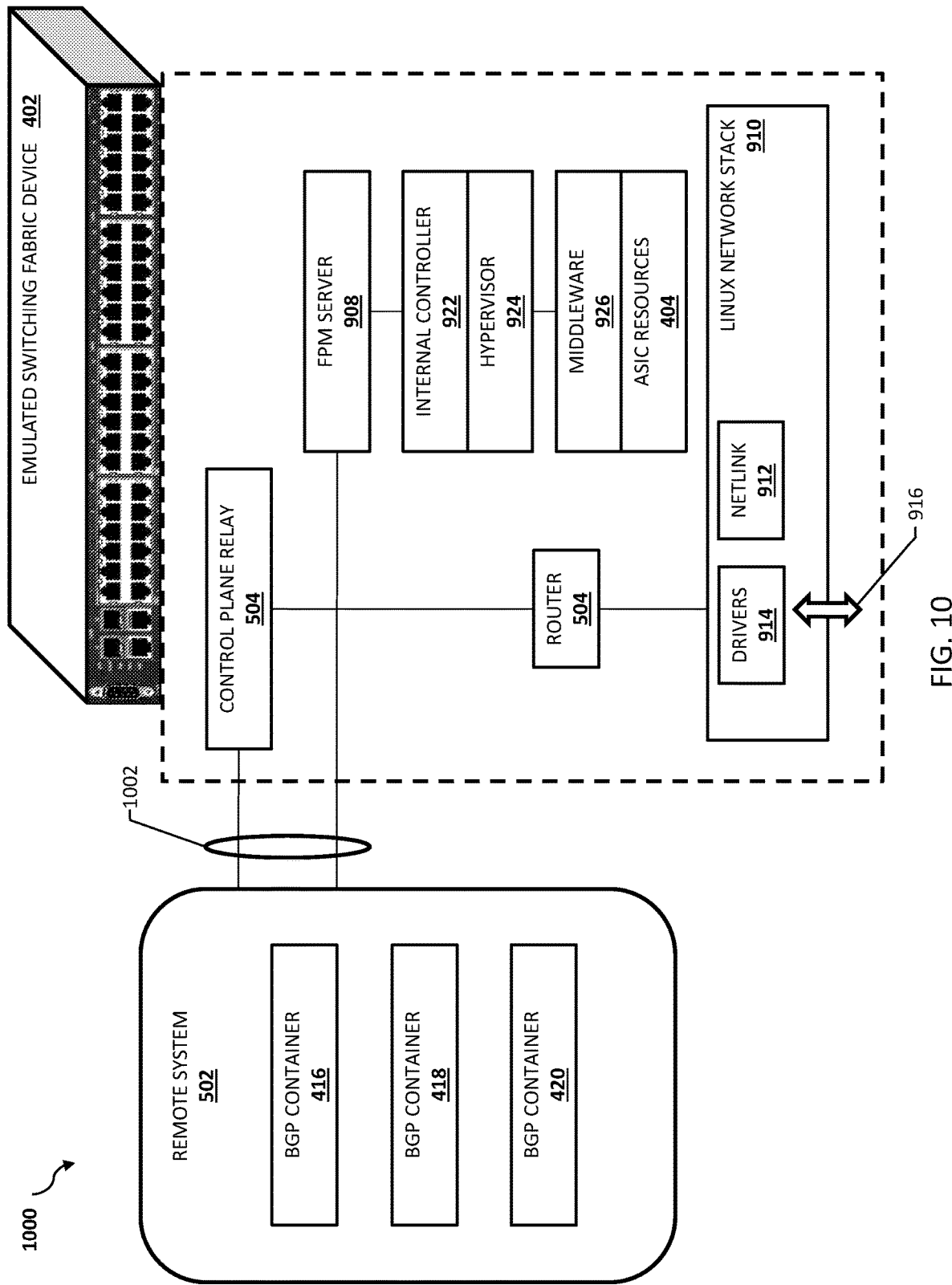
FIG. 10 is block diagram of a testing system where the emulated switch control plane daemons are running on a remote system.

FIG. 10 is block diagram of a testing system 1000 where the emulated switch control plane daemons 416, 418, and 420 are running on a remote system 502, e.g., in a separate computer or in the cloud. In some examples, a container runs for each emulated switch requiring control plane daemons. For example, a DASH high availability topology might only need emulated ToRs, whereas some use cases might need control plane daemons for every emulated switch.

Control plane traffic flows between the offboard containers and a management port 1002 (or it could be on one of the traffic ports) inside a "tunnel," which could be, e.g., a virtual local area network (VLAN), whose VLAN ID or VID gets mapped to an emulated switch's port(s). The control plane relay 504 strips off the tunnel and forwards this traffic out the corresponding front-panel port of the switch, using either the Linux routing and knet drivers, or direct ASIC routing via the ASIC's CPU port. The traffic will be received on the far end, e.g., at a DPU or host cabled to the corresponding emulated ToR.

Off-board container control plane route updates are sent from the fpmsyncd or equivalent function, to the management port 1002, and received by the fpm server 908 (e.g., it exposes a gRPC endpoint for streaming updates sent by the control plane daemon). The fpm server 908 (which could be an interface on an enhanced version of existing API server) interprets route change events corresponding to the emulated topology and sends new messages to the API server, according to its northbound or some internal interface. The API server then updates the emulated topology through its hypervisor logical-to-physical translation function and southbound SODA interface to finally update the ASIC's physical routing tables.

The remote system control plane containers 416, 418, and 420 can be configured in any appropriate manner. For example, in one option, the system 1000 can use the FRR routing package including BGP, BFD, and Zebra router daemons, plus a custom fpmsyncd daemon to translate router updates from Zebra into remote route update messages to be sent to the fpm server 908. In another option, the system 1000 can use just BGP and BFD daemons, plus a custom relay function that listens to route add/withdrawal updates from BGP and converts those to fpm update messages.

Figure 11:
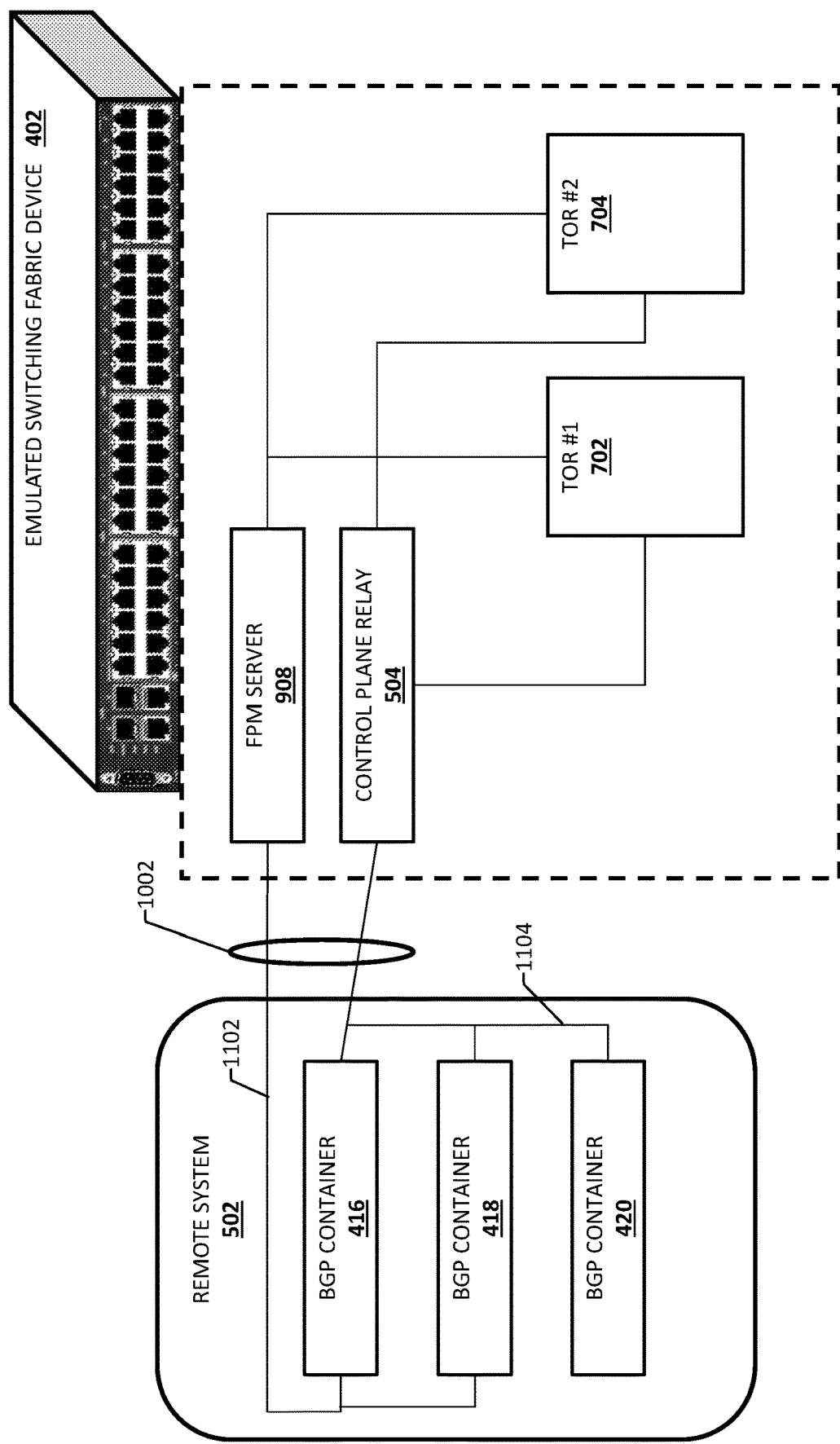
FIG. 11 is a block diagram illustrating the logical flow of control plane and forwarding manager update traffic.

FIG. 11 is a block diagram illustrating the logical flow of control plane and forwarding manager update traffic for the system 1000 of FIG. 10. FIG. 11 shows the flow of forwarding plane updates 1102 and control plane traffic 1104 through the fpm server 908 and the control plane relay 504 to the emulated ToR switches 702 and 704. Due to the control plane relay 504, the traffic may go to the front panel ports toward the SUT.

Figure 12:
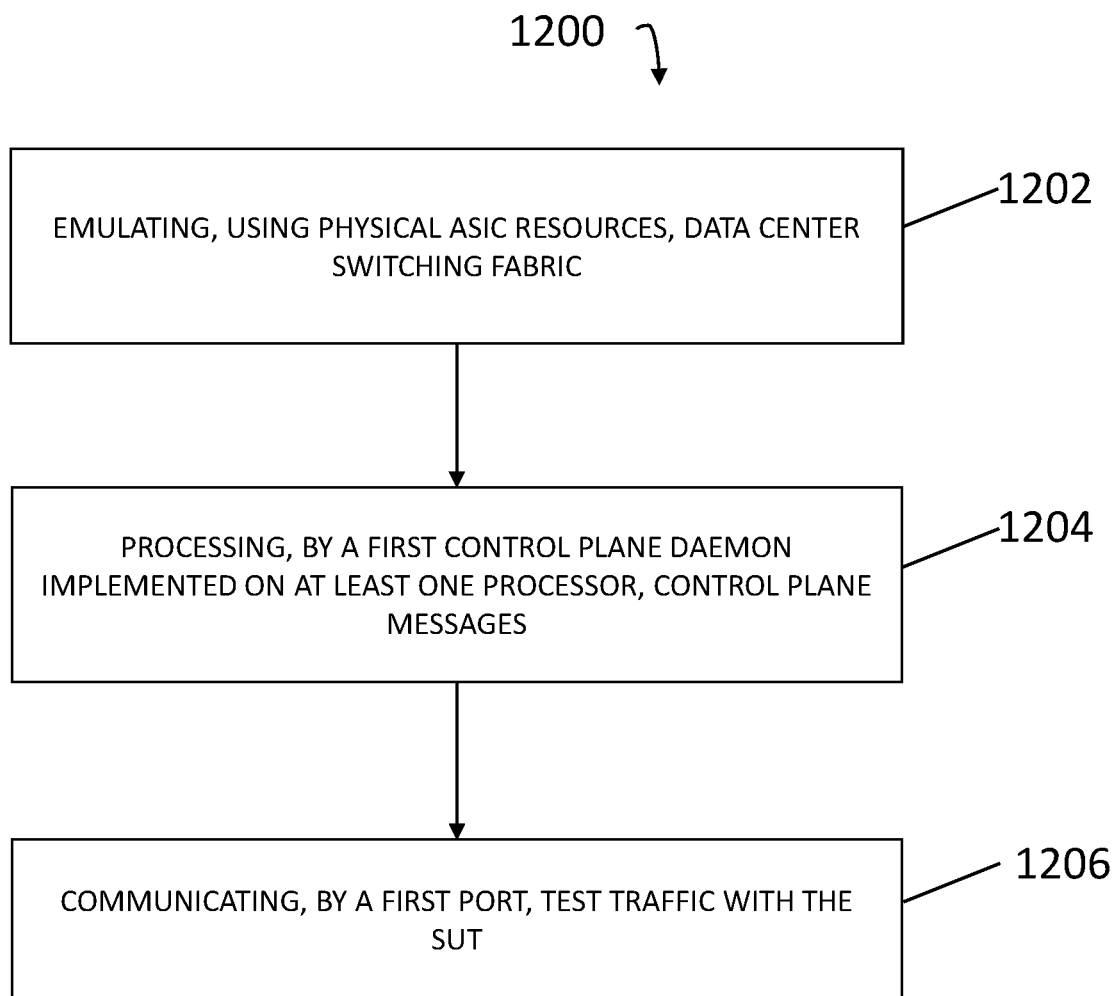
FIG. 12 is a flow diagram of an example method for testing a network SUT.

FIG. 12 is a flow diagram of an example method 1200 for testing a network SUT. The method 1200 includes emulating, using physical application-specific integrated circuit (ASIC) switching resources, data center switching fabric comprising a plurality of data center fabric switching elements (1202). The method 1200 includes processing, by a first control plane daemon implemented on at least one processor, control plane messages for a first data center fabric switching element (1204). The method 1200 includes communicating, by a first port, test traffic with the SUT (1206). The test traffic includes at least a first control plane message for processing by the first control plane daemon. The first control plane message can be received from, and/or transmitted to, one of a test system component (e.g., an SDN controller or SDN controller emulation associated with the test system) or one or more DUT/SUT devices.

In some examples, the at least one processor is physically co-located with the physical ASIC switching resources in an emulated datacenter testbed device. In some other examples, the at least one processor is physically located remote from an emulated datacenter testbed device housing the physical ASIC switching resources. The method 1200 can include relaying, by a control plane relay daemon, the control plane messages from the emulated datacenter testbed device to the first control plane daemon. In some examples, the method 1200 includes executing a test script for testing the SUT based on the test traffic communicated with the SUT and outputting a test report.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A system for testing a network system under test (SUT), the system comprising:
   physical application-specific integrated circuit (ASIC) switching resources;
   a switching environment emulator configured for emulating, using the physical ASIC switching resources, data center switching fabric comprising a plurality of data center fabric switching elements;
   a first control plane daemon implemented on at least one processor, wherein the first control plane daemon is configured for processing control plane messages for a first data center fabric switching element of the data center switching fabric emulated using the physical ASIC switching resources, and wherein the at least one processor is physically located remote from an emulated datacenter testbed device housing the physical ASIC switching resources;
   a first port for communicating at least a first control plane message for processing by the first control plane daemon; and
   a control plane relay daemon configured to relay the control plane messages from the emulated datacenter testbed device to the first control plane daemon, wherein the control plane relay daemon is configured to relay additional control plane messages from additional data center fabric switching elements of the data center switching fabric emulated using the physical ASIC switching resources to a pool of control plane daemons executed by the at least one processor remote from the emulated datacenter testbed device.

2. The system of claim 1, wherein the first control plane daemon is configured for processing the control plane messages according to one or more of the following protocols: border gateway protocol (BGP), BGP+, bidirectional forwarding detection (BFD), address resolution protocol (ARP), a routing protocol, forwarding plane manager (FPM), and OpenFlow.

3. The system of claim 1, comprising a plurality of containers, executed by the at least one processor, configured for hosting the pool of control plane daemons, wherein the control plane relay is configured to relay the additional control plane messages to the containers.

4. The system of claim 1, comprising a software defined networking (SDN) controller configured for translating control plane commands or events for modifying the data center switching fabric.

5. The system of claim 1, wherein the first data center fabric switching element comprises a top of rack (ToR) switch.

6. The system of claim 1, wherein emulating the data center switching fabric comprises emulating a Disaggregated APIs for SONiC (DASH) high-availability configuration.

7. The system of claim 1, comprising a test module configured for executing a test script for testing the network SUT based on test traffic communicated with the network SUT and outputting a test report.

8. A method for testing a network system under test (SUT), the method comprising:
   emulating, using physical application-specific integrated circuit (ASIC) switching resources, data center switching fabric comprising a plurality of data center fabric switching elements;
   processing, by a first control plane daemon implemented on at least one processor, control plane messages for a first data center fabric switching element of the data center switching fabric emulated using the physical ASIC switching resources, wherein the at least one processor is physically located remote from an emulated datacenter testbed device housing the physical ASIC switching resources;
   communicating, by a first port, at least a first control plane message for processing by the first control plane daemon;

relaying, by a control plane relay daemon, the control plane messages from the emulated datacenter testbed device to the first control plane daemon; and relaying, by the control plane relay daemon, additional control plane messages from additional data center fabric switching elements of the data center switching fabric emulated using the physical ASIC switching resources to a pool of control plane daemons executed by the at least one processor remote from the emulated datacenter testbed device.

9. The method of claim 8, wherein the first control plane daemon is configured for processing the control plane messages according to one or more of the following protocols: border gateway protocol (BGP), BGP+, bidirectional forwarding detection (BFD), address resolution protocol (ARP), a routing protocol, forwarding plane manager (FPM), and OpenFlow.

10. The method of claim 8, comprising hosting, on a plurality of containers executed by the at least one processor, the pool of control plane daemons, wherein the control plane relay is configured to relay the additional control plane messages to the containers.

11. The method of claim 8, comprising translating, by a software defined networking (SDN) controller, control plane commands or events for modifying the data center switching fabric.

12. The method of claim 8, wherein the first data center fabric switching element comprises a top of rack (ToR) switch.

13. The method of claim 8, wherein emulating the data center switching fabric comprises emulating a Disaggregated APIs for SONiC (DASH) high availability fabric.

14. The method of claim 8, comprising executing a test script for testing the network SUT based on test traffic communicated with the network SUT and outputting a test report.

* * * * *